Nov. 24, 1925.  
C. M. GAUTIER  
1,562,753  
MANUFACTURE OF PNEUMATIC TIRE COVERS OR CASINGS AND IN MACHINE THEREFOR  
Filed May 10, 1923

INVENTOR  
Claude Marie Gautier  
By Byrnes, Stebbins & Parmelee  
His Attys

Patented Nov. 24, 1925.

1,562,753

UNITED STATES PATENT OFFICE.

CLAUDE MARIE GAUTIER, OF LONDON, ENGLAND.

MANUFACTURE OF PNEUMATIC-TIRE COVERS OR CASINGS AND IN MACHINE THEREFOR.

Application filed May 10, 1923. Serial No. 638,004.

*To all whom it may concern:*

Be it known that I, CLAUDE MARIE GAUTIER, a citizen of the French Republic, residing in London, England, have invented certain new and useful Improvements in the Manufacture of Pneumatic-Tire Covers or Casings and in Machines Therefor, of which the following is a specification.

This invention is for improvements in or relating to the manufacture of pneumatic tire-covers or casings and in machines therefor. The invention is concerned chiefly with case-making machines of the type in which a strip of canvas or cord fabric is wound on to a drum and formed into an endless band or ring for subsequent treatment in a forming press or other machine.

Canvas tire fabric is usually cut on the bias, and in the case of cord fabric the cords are arranged diagonally, and difficulty is experienced in correctly locating the fabric ring, after it has been removed from the first forming-drum, on the core or former of another machine. An object of the invention is to overcome this difficulty.

The present invention comprises a step in the manufacture of pneumatic tire-casings which consists in marking on the fabric band or ring, while in position on the first forming drum, index lines or other marks (for example, a longitudinal line and cross lines therefor) such as to serve as indicating means for use in setting up the band or ring without distortion in any subsequent operation.

The present invention further comprises in a tire case-making machine of the type referred to the provision of means for marking on the fabric ring while in position on the drum, index lines or other marks which serve as indicating means to enable the said ring to be correctly located after removal from said drum on the core or former of another machine.

Preferably marking devices are arranged to produce on the fabric band one or more circumferential lines and a plurality of transverse lines at intervals around the circumference of said band, said transverse lines being preferably at right-angles to the circumferential line.

Conveniently, the circumferential marking device comprises a rotatable disc carried on a pivoted arm in such manner as to trace a line around the middle of the fabric band and the transverse marking device comprises a rotatable disc carried on an arm mounted to swing on a slidable member whereby said disc may be engaged with the band and traversed across the face of same in a direction parallel to the axis of rotation of the drum.

Further features of the invention will be hereinafter described and pointed out in the claims.

In the accompanying drawing which illustrates a preferred embodiment of the invention;

Figure 1:
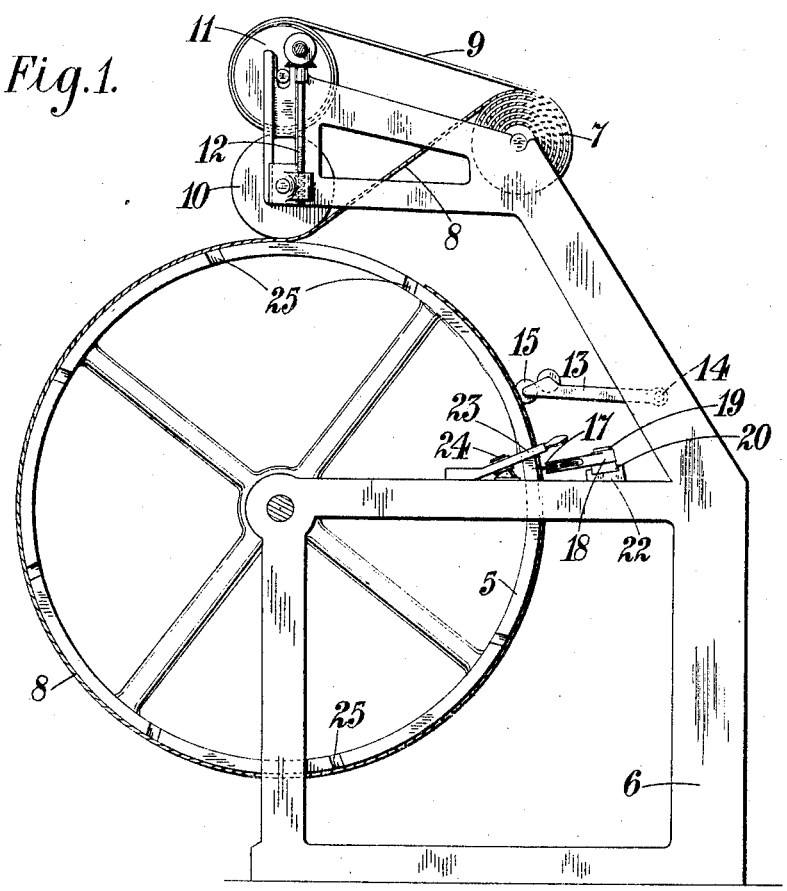
Figure 1 is a side elevation of the machine.

The drawing is to some extent diagrammatic.

The forming drum 5 upon which lengths of canvas or cord fabric are to be wound is mounted for rotation in the frame 6 and is rotated by any suitable means. The frame 6 carries also the stock roll 7 on which is wound the tire fabric 8 together with a backing strip 9. The tire fabric passes under the roller 10 on to the forming drum 5 and the backing strip passes straight to the roller 11 on which it is wound and which is driven by contact with the roller 10. The roller 10 is driven by contact with the fabric on the drum 5 and thus the stock roll 7 is rotated by the pull of the backing strip 9 and the tire fabric is relieved of tension. The rollers 10 and 11 are suitably mounted to slide in a vertical direction in the frame and the roller 10 is provided with a device 12 whereby the pressure of the roller on the drum 5 may be varied.

An arm 13 pivoted to the frame 6 at 14 carries at its free end a rotatable disc 15 which contacts with the fabric 8 on the drum and traces a circumferential line 16 (see Figure 2) around the middle of the fabric band. The transverse marking device comprises a rotatable disc 17 which is carried at the free end of an arm 18 mounted to swing about a pivot 19 on a member 20 slidable in the block 22 on the frame 6. The marking devices may be arranged to form lines by depressions or they may be adapted to ink or otherwise mark the fabric.

Figure 2:
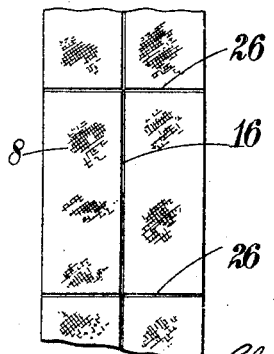
Figure 2 is a view of a portion of the fabric-band showing the position of the lines thereon.

A spring-controlled lever 23 pivoted to the frame at 24 is adapted to engage recesses 25 in the edge of the drum 5 to arrest its rotation at regular intervals to enable the disc 17 to be traversed across the face of the drum to form the transverse lines 26 (see Figure 2).

The endless band formed on the drum may of course comprise more than one ply of fabric of which the outer layer only may be marked. When the band is removed from the drum and placed on the core or former of another machine the lines form guides which enable the operator to square up the band on the core expeditiously and with a certainty that the fabric is not distorted.

What I claim as my invention and desire to secure by Letters Patent is:

1. In a machine for marking tire-casings, the combination with a rotatable cylindrical member, and means for winding thereon a strip of fabric into the form of an endless band, of means for marking on the fabric, while in position on the said member and during the winding operation, indices in the form of a circumferential line and a plurality of transverse lines for serving as indicating means to enable said endless band to be correctly located, after removal from said member, on a former, substantially as described.

2. In a machine for marking tire-casings, the combination with a cylindrical member, and means for winding thereon a strip of fabric into the form of an endless band, of a marking device for marking on the fabric, while in position on the said member, an index in the form of a circumferential line, and a second marking device for marking on the fabric, while in position on the said member, indices in the form of a plurality of transverse lines, for the purpose set forth.

3. In a machine for marking tire-casings, the combination with a rotatable cylindrical member, and means for winding thereon a strip of fabric into the form of an endless band, of means for marking on the fabric, while in position on the said member, indices in the form of a circumferential line marked during angular movement of the cylindrical member and a plurality of transverse lines that are arranged at intervals around the circumference of said band and intersect the said circumferential line at rightangles and are marked during pauses between angular movements of the cylindrical member for the purpose described.

4. In a machine for marking tire-casings, the combination with a frame, a cylindrical member mounted to rotate thereon, and means for winding on the said member a strip of fabric into the form of an endless band, of a circumferential marking-device comprising an arm pivoted on the frame and carrying a disc arranged to trace a line around the middle of the fabric band on the said member, and a transverse marking-device comprising a sliding member slidable on the frame in a direction parallel to the axis of rotation of the drum, an arm pivoted on said sliding member, and a disc rotatably carried by the latter arm and arranged to coact with the band and to be traversed across the face of the same in a direction parallel to the axis of rotation of the said member, substantially as described.

5. In a machine for marking tire-casings, the combination with a frame, a cylindrical member mounted to rotate thereon, and means for winding a strip of fabric on the said member into the form of an endless band, of a circumferential marking device comprising an arm pivoted on the frame, and a disc carried by said arm and arranged to trace a line around the middle of the fabric band on the rotating member, means for stopping the rotation of said member at intervals, and a transverse marking-device comprising a sliding member slidable on the frame in a direction parallel to the axis of rotation of the drum, an arm pivoted on said sliding member, and a disc rotatably carried by the latter arm and arranged to coact with the endless band and to be traversed across the face of the band, when the said cylindrical member is arrested, in a direction parallel to the axis of rotation of the cylindrical member, substantially as described.

6. In a machine for marking tire-casings the combination with a frame, a drum mounted to rotate thereon, and having a plurality of recesses spaced angularly apart at equal distances from one another and from the axis of rotation of the drum, and means for winding a strip of fabric on the drum into the form of an endless band, of a circumferential marking device comprising an arm pivoted on the frame, and a disc carried by said arm and arranged to trace a line around the middle of the fabric band on the drum, a transverse marking device comprising a disc arranged to coact with the band and to be traversed across the same in a direction parallel to the axis of rotation of the drum, and a lever pivoted on the frame and arranged to engage said drum in said recesses and arrest the rotation of the same, substantially as described.

In testimony whereof I affix my signature.

CLAUDE MARIE GAUTIER.